(12) United States Patent
Sinclair

(10) Patent No.: US 10,488,912 B1
(45) Date of Patent: Nov. 26, 2019

(54) METHOD AND APPARATUS FOR ANALYZING SENSOR DATA

(71) Applicant: Digimarc Corporation, Beaverton, OR (US)

(72) Inventor: Eoin C. Sinclair, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 81 days.

(21) Appl. No.: 15/882,963

(22) Filed: Jan. 29, 2018

Related U.S. Application Data

(60) Provisional application No. 62/451,487, filed on Jan. 27, 2017.

(51) Int. Cl.
| | |
|---|---|
| *G06F 1/32* | (2019.01) |
| *G06F 1/3234* | (2019.01) |
| *G06F 17/18* | (2006.01) |
| *G06T 7/77* | (2017.01) |
| *H04N 5/232* | (2006.01) |
| *G06K 9/20* | (2006.01) |

(52) U.S. Cl.
CPC ............ *G06F 1/3234* (2013.01); *G06F 17/18* (2013.01); *G06K 9/2054* (2013.01); *G06T 7/77* (2017.01); *H04N 5/23241* (2013.01)

(58) Field of Classification Search
CPC ...... G06F 1/3234; G06F 17/18; G06K 9/2054
See application file for complete search history.

(56) References Cited

U.S. PATENT DOCUMENTS

| | | | |
|---|---|---|---|
| 6,442,284 | B1 | 8/2002 | Gustafson |
| 6,516,079 | B1 | 2/2003 | Rhoads |
| 7,013,021 | B2 | 3/2006 | Sharma |
| 2007/0278306 | A1* | 12/2007 | Brock ............... G06K 7/10722 235/462.11 |
| 2011/0161076 | A1 | 6/2011 | Davis |
| 2011/0212717 | A1 | 9/2011 | Rhoads |
| 2012/0116559 | A1 | 5/2012 | Davis |
| 2013/0150117 | A1 | 6/2013 | Rodriguez |
| 2014/0106710 | A1 | 4/2014 | Rodriguez |
| 2014/0363044 | A1 | 12/2014 | Williams |
| 2017/0045895 | A1* | 2/2017 | Wang .................... G05D 1/101 |

* cited by examiner

*Primary Examiner* — Albert Wang
(74) *Attorney, Agent, or Firm* — Digimarc Corporation

(57) ABSTRACT

Mobile devices, such as smartphones, are severely battery-limited. The capabilities of mobile device processors have increased at exponential rates, but battery technologies have improved at much slower rates. As a consequence, it is ever more important that mobile devices be operated in battery-preserving manners. An aspect of the present technology concerns methods and arrangements enabling on-going recognition-processing of imagery and audio by different detectors, without the high battery drain that has characterized the prior art. A variety of other features and arrangements are also detailed.

18 Claims, 15 Drawing Sheets

```
GLOBAL all_detectors                = [ detector1, detector2, ... detectorN ]
GLOBAL prioritized_detectors        = all_detectors.atIndex(0)
GLOBAL other_detectors              = all_detectors.copy().removeObjectAtIndex(0)
GLOBAL next_prioritized_detectors   = []
GLOBAL next_other_detectors         = []

new data buffer:
    if prioritized_detectors.count > 0:
        for detector in prioritized_detectors:
            result = run detector
            if result == SUCCESS:
                next_prioritized_detectors.append(detector)
            else:
                next_other_detectors.append(detector)
        prioritized_detectors.clear()

result = run other_detectors.pop()
    if result == SUCCESS:
        next_prioritized_detectors.append(detector)
    else:
        next_other_detectors.append(detector)
    if other_detectors.isEmpty():
        prioritized_detectors       = next_prioritized_detectors.copy()
        other_detectors             = next_other_detectors.copy()
        next_prioritized_detectors  = []
        next_other_detectors        = []
```

FIG. 8A

```
// allDetectors and lastFrameSuccessfulDetectors are arrays;
// allDetectors is const, lastFrameSuccessfulDetectors is mutable
global const    NUM_DETECTORS                   = ...
global const    allDetectors                    = [ detector1, detector2, detector3, ..., detectorN ]

global var      lastFrameSuccessfulDetectors    = []

// A bit field to keep track of which detectors have been run most recently,
// and make sure that everybody's getting a turn
global uint32   detectorRoundRobinBitField              = 0
// Will be filled in by Initialize(), to compare against later
global uint32   detectorRoundRobinCompleteValue         = 0

// Constructor or initial entry point
function Initialize() {
    // Create value for fast comparison to current round-robin bit field.
    for (var i = 0; i < NUM_DETECTORS; i ++) {
        detectorRoundRobinCompleteValue |= 0x1 << i
    }
}

```
// Every incoming frame
function IncomingBuffer(buffer) {
    // Will replace lastFrameSuccessfulDetectors with this at end of function call --
    // this is a mutable array.
    var thisFrameSuccessfulDetectors = []

// Run all successful detectors from last frame, and indicate their having
    // been run by or-equaling their index(es) in the round-robin bit field.
    for (detector in lastFrameSuccessfulDetectors) {
        var detectStatus = detector.ProcessFrame(buffer)
        if (detectStatus == SUCCESS) {
            ReportSuccess(detector)
            thisFrameSuccessfulDetectors.append(detector)
        }
        detectorRoundRobinBitField |= 0x1 << allDetectors.indexOfObject(detector)
    }

// Find first index of not-yet-run detector in current round-robin round
    for (var i = 0; i < NUM_DETECTORS; i ++) {
        if ((detectorRoundRobinBitField >> i) & 0x1 == 0) {
            // ..and run it
            var roundRobinDetector = allDetectors[i]
            var detectStatus = roundRobinDetector.ProcessFrame(buffer)
            if (detectStatus == SUCCESS && ! lastFrameSuccessfulDetectors.contains(roundRobinDetector)) {
                ReportSuccess(roundRobinDetector)
                thisFrameSuccessfulDetectors.append(roundRobinDetector)
            }
            // Indicate to our bit field that we've run this one in the current round-robin round
            (detectorRoundRobinBitField >> i) |= 0x1
        }
    } if (detectorRoundRobinBitField === detectorRoundRobinCompleteValue) {
        // Alright --- round-robin complete. Start again.
        detectorRoundRobinBitField = 0
    } lastFrameSuccessfulDetectors = thisFrameSuccessfulDetectors
} function ReportSuccess(detector) {
    // Report successful read to whomever needs to know
}
```

FIG. 9B

| | | | | | | | |
|---|---|---|---|---|---|---|---|
| 1 | D1 | N | | | | | |
| 2 | D2 | Y | | | | | |
| 3 | D3 | Y | D2 | Y | | | |
| 4 | D4 | N | D2 | Y | D3 | Y | |
| 5 | D1 | N | D2 | Y | D3 | Y | |
| 6 | D4 | N | D2 | Y | D3 | Y | |
| 7 | D1 | N | D2 | Y | D3 | N | |
| 8 | D4 | N | D2 | Y | | | |
| 9 | D1 | N | D2 | Y | | | |
| 10 | D3 | N | D2 | N | | | |
| 11 | D4 | N | | | | | |
| 12 | D1 | N | | | | | |
| 13 | D2 | N | | | | | |
| 14 | D3 | N | | | | | |
| 15 | D4 | N | | | | | |
| 16 | D1 | N | | | | | |

66

PROCESSING TIME FOR DETECTOR D1
NO READ
| D1 | N |

PROCESSING TIME FOR DETECTOR D1
SUCCESSFUL READ
| D1 | Y |

FIG. 10A

… # METHOD AND APPARATUS FOR ANALYZING SENSOR DATA

RELATED APPLICATION DATA

This application claims priority to provisional application 62/451,487, filed Jan. 27, 2017, the disclosure of which is incorporated herein by reference.

BACKGROUND AND INTRODUCTION

Mobile devices, such as smartphones, are severely battery-limited. The capabilities of mobile device processors have increased at exponential rates, but battery technologies have improved at much slower rates. As a consequence, it is ever more important that mobile devices be operated in battery-preserving manners.

Analysis of camera and microphone data, e.g., for recognition purposes, are tasks that are particularly battery-intensive. Mobile device cameras typically capture 30 to 50 frames of imagery per second. If each frame is processed to decode a barcode or steganographic digital watermark, or to otherwise recognize a subject depicted in the frame, the device battery would be exhausted quickly. Accordingly, such recognition processing is not routinely performed. Yet it would be advantageous if such devices were able, practically, to analyze incoming camera/microphone data in more of an on-going fashion, to serve as adjuncts to the users' eyes and ears.

One aspect of the present technology concerns methods and arrangements enabling recognition-processing of imagery and audio to be on-going, without the high battery drain that has characterized the prior art.

The foregoing and additional features and advantages of the present technology will be more readily apparent from the following detailed description, which proceeds with reference to the accompanying drawings.

BRIEF DESCRIPTION OF THE DRAWINGS

FIG. 8A comprises pseudo code illustrating certain aspect of the present technology.

FIGS. 9A and 9B comprise pseudo code illustrating certain other aspects of the present technology.

FIG. 10A depicts an illustrative operation of a system using aspects of the FIGS. 9A/9B code.

DETAILED DESCRIPTION

Figure 1:
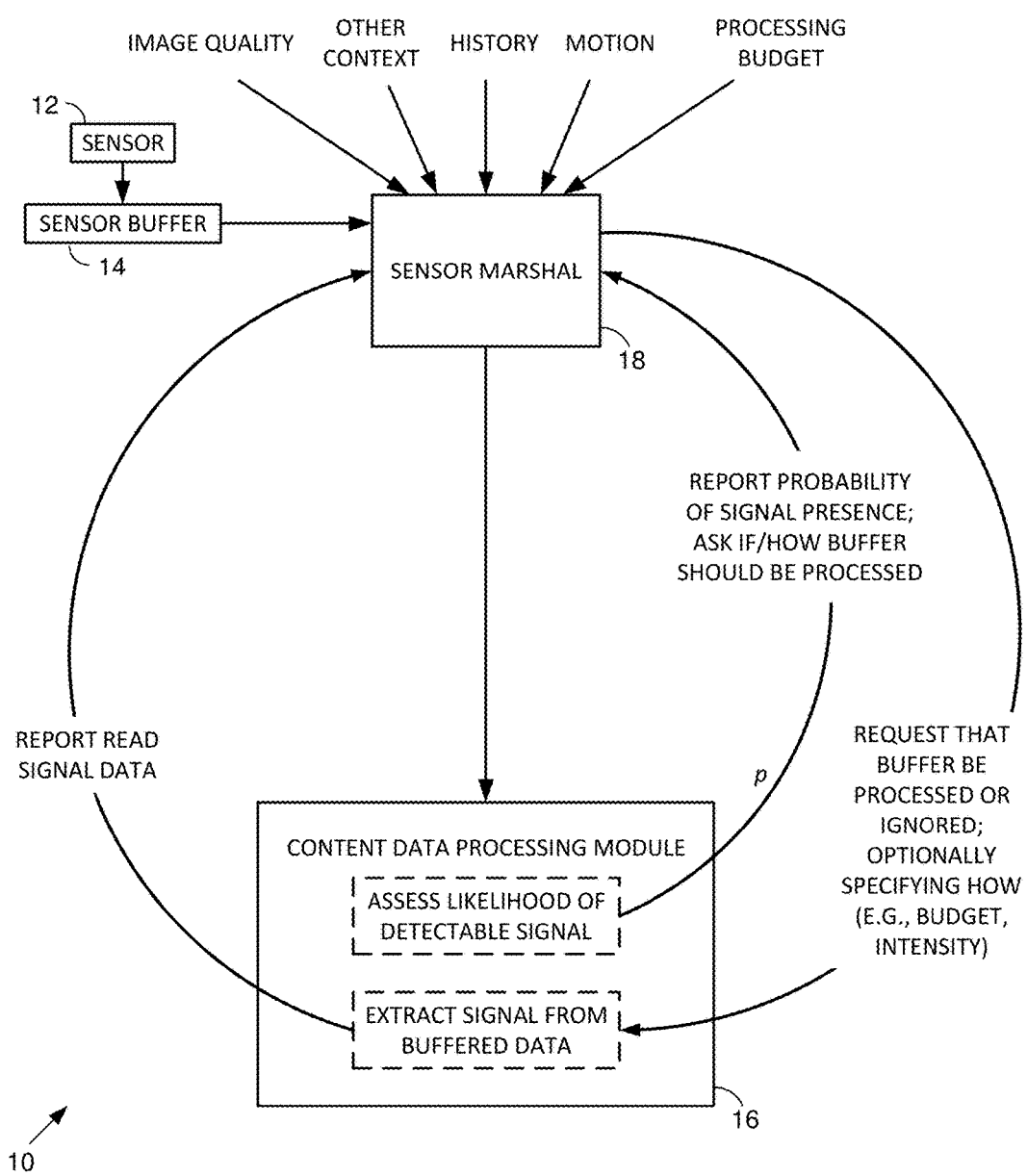
FIG. 1 illustrates certain aspects of one embodiment of the present technology.

In previous patent filings, applicant detailed intuitive computing architectures that are alert to the user's context, and pro-actively initiate content recognition operations that may be useful to the user in such context. In a supermarket, for example, a smartphone may launch barcode- and watermark-reading capabilities, to help a user interact with product packaging. At work, a smartphone may listen for what sounds like speech, and launch speech recognition functionality in response. It may likewise notice if the camera is pointed to a high-contrast monochromatic image subject, and launch OCR functionality in response. At an evening party, a smartphone may be alert for music, and launch a music recognition app.

Technologies useful in the foregoing are detailed in patent documents 20110161076, 20110212717, 20130150117, each of which is incorporated-by-reference as if fully set forth herein.

To reduce the battery consumption associated with such operations, it is useful to first assess incoming content data to determine whether recognition-processing appears promising (i.e., is likely to be worthwhile), using a low-intensity processing operation. As an example, if a user's phone is in a dark purse or pocket, and simple examination of captured camera data reveals it to be dark and featureless, then there is no point in trying to extract a barcode or digital watermark, etc.

Such low-intensity operation may be termed a "screening," or "assessing," operation—to determine whether a further, higher-intensity processing operation, which may be termed an "extraction operation," should be attempted. The term "detection operation" can refer generally to such operations—often applying an assessing operation first, and then continuing to an extraction operation.

More sophisticated screening operations, to determine if recognition-processing is likely to be successful, are disclosed in applicant's publications U.S. Pat. Nos. 6,442,284, 6,516,079 7,013,021, and 20150030201, and in patent application Ser. No. 15/059,690, filed Mar. 3, 2016 (now U.S. Pat. No. 9,892,301), and Ser. No. 15/154,529, filed May 13, 2016 (now U.S. Pat. No. 10,217,182).

Assessing and extraction operations each typically have several successive stages. For example, in watermark extraction, one stage may compute and refine several estimates of candidate scale and rotation transforms, to describe possible mappings of captured imagery back to its original, pristine, form. Each of these candidates, in turn, can be evaluated to determine a most probable measure for an image translation parameter. With rotation, scale and translation estimates, various differential scale parameters may be tried, to further optimize transformation of the captured imagery back to its pristine state. After the captured image is transformed by these parameters back to a re-creation of a watermark signal's original coordinate system, the watermark extractor performs a further sequence of operations to attempt recover of a payload.

At several points through this just-described extraction process—as well as in other recognition processes—the effort can fail, and subsequent stages of operation are then not invoked. This is a long way of introducing the notion that that many component extraction operations may be viewed as further assessment stages—gating the performance of subsequent operations, and sparing further battery consumption if the extraction attempt is aborted. (These latter types of operations may be regarded as "hybrid assessment" operations—serving both to possibly trigger abandonment of an on-going extraction operation, and also to provide data predicates used in subsequent processing to achieve data extraction. If an assessment operation does not yield such data predicates, it may be regarded as a "solely assessment" operation. An operation that examines smartphone camera data to determine if the imagery is dark and featureless—suggesting the smartphone is in a purse or pocket—is an example of a "solely assessment" operation.)

While preserving battery power is generally aided by not invoking a high intensity operation until an initial assessment indicates such operation has a likelihood of success, applicant has discovered that still further improvements in battery economy can be achieved.

FIG. 1 shows a system 10 that employs certain aspects of the present technology. Included in this particular arrangement are a sensor 12, a sensor buffer 14, a content data processing module 16, and a sensor marshal module 18.

Sensor 12 is an image sensor, such as the camera of a smartphone. In other embodiments the sensor can be otherwise, such as a microphone. The sensor buffer 14 is a memory that receives data from the sensor 12, and makes such data available to other elements of the system.

The content data processing module 16 performs two functions. One function is a low-intensity (or "lightweight") content evaluation function—assessing whether the data in the buffer 14 likely contains recognizable content. It is lightweight in a processing intensity sense, typically requiring less than 50% the processing work (and more typically less than 10% or even less than 5% or 1% the processing work) of actually performing a recognition operation on the buffered content. It can output a signal p ranging from 0 to 1, indicating an estimated probability that application of a particular recognition process to the buffered data will be successful.

The second function of the content data processing module is this more processor-intense operation: applying that particular recognition process to the buffered content to attempt extraction of information (e.g., a barcode or digital watermark payload).

The sensor marshal module 18 controls the noted operations including—importantly—sometimes not invoking the second (extraction) operation, even if the lightweight content evaluation function of module 16 indicates the buffer likely contains recognizable data.

Applicant's prior arrangements lacked the functionality of the sensor marshal module 18. In applicant's prior art, an assessment was made whether data in the sensor buffer likely contains extractable information and, if so, extraction ensued. The present sensor marshal module 18 allows for more nuanced judgments.

In particular, sensor marshal module 18 can combine multiple factors in deciding that content recognition should be invoked on this, but not that, promising data from the buffer.

One factor is detection history. If recognition processing was successfully invoked on one image frame, it is not generally necessary to invoke recognition processing on a promising frame that is captured $\frac{1}{30}^{th}$ of a second later.

Such decisions are harder with the passage of more time. Should recognition processing be invoked on a promising image frame that is captured ½ second later? 2 seconds later?

In accordance with an aspect of the present technology, the noted factor (history) is combined with other information in answering these questions. One such item of other information is camera motion. If the camera is sensed as stationary, a frame of imagery captured ½ second, two seconds, or even ten seconds or more after the first, normally is likely to reveal no new information, so module 18 may decide that no further extraction needs to be attempted. However, if accelerometers, or other motion sensors, or examination of captured imagery, indicate that the camera viewpoint has changed, then module 18 can indicate that a further extraction attempt is warranted, even just ½ second after a previously-successful extraction operation.

A different result may be reached if the context is a stationary camera that is viewing a manufacturing line. If items move along the manufacturing line at speeds of several feet per second, then even an elapsed interval of $\frac{1}{30}^{th}$ of a second between captured frames may indicate recognition-processing should be performed anew.

Still another factor that merits consideration is a processing budget. Again, applicant's prior art arrangement attempted extraction whenever the buffered content appeared promising. Processing could continue until time ran out (e.g., until a new frame was captured and found to be promising).

In an embodiment of the present technology, a processing budget can be established, and the marshal module 18 can invoke recognition operations so as to stay within the specified budget. Thus, there is not a binary choice as in the prior art (e.g., don't attempt extraction, or attempt extraction until time runs out); rather, a variable threshold can be applied.

The processing budget can be established using various metrics. Perhaps the simplest is core processing time, e.g., a microprocessor core should allow 5 milliseconds of processing in this circumstance; 15 milliseconds in that circumstance; etc.

The foregoing factors are illustrative. Other information about user context or processing context can also be considered by the marshal module 18 in evaluating whether to invoke recognition processing by module 16. One such other factor is image quality (or change in image quality), e.g., as judged using a contrast (sharpness) metric. For example, if the camera and depicted subject are generally stationary, and the last attempt to extract information failed—but the current frame is sharper, then an attempt to extract data from the current frame can be justified. In contrast, if the last attempt at extraction failed, and the current frame is blurrier, then an attempt should not be made to extract data from the current frame.

In addition to deciding whether to invoke one or more data extraction operations, the marshal module can also determine a level of intensity (distinct from processing budget) that should be applied to each decoding effort. For example, in watermark decoding, the detector may identify a ranked list of estimates as to decoding parameters (e.g., sets of scale/rotation/translation transform parameters). In a low intensity effort, the decoder may attempt decoding using just the top-ranked estimate of transform parameters. With higher intensity attempts, the decoder may try n different sets of possible decoding parameters (of successively lower probabilities)—in an attempt to find one that yields successful decoding. (Similar parameters likewise govern other types of recognition operations and can be applied similarly, in accordance with an intensity parameter.)

Implementation of marshal module 18 can be achieved in various ways. A simple embodiment, in the case of an illustrative watermark detector, generates the parameter n by evaluating a polynomial expression that varies with the probability p output by the content data processing module, based on its assessment of the buffered data. The output of the polynomial expression dictates how many sets n of transform parameter candidates, in the ranked list of such candidates produced by the watermark detector, should be tried in attempting to extract a watermark payload. For example, the expression may be:

$$n=(4p)^{1.5}-3$$

If the probability p is 1.0, the top 5 sets of parameter candidates are tried. If the probability is 0.6, only the top-ranked set of parameter candidates is tried. If the probability is below 0.58, no watermark extraction is attempted.

Additional mathematical terms can be included in the polynomial expression to increase the watermark decoding effort, e.g., if the previous watermark decoding attempt was unsuccessful, and image sharpness has improved since that attempt, or if the camera orientation has been turned more than five degrees since that attempt. Other mathematical terms can be applied to decrease the watermarking decoding effort, e.g., by the reciprocal of the time, in seconds, that has elapsed since digital watermark data was successfully extracted from buffered imagery.

Another implementation of marshal module 18 employs a multi-dimensional table, to which quantized context parameters are applied, e.g., the probability p of successful detection; the elapsed time since the last successful watermark detection; and, if the previous decoding attempt was unsuccessful, then the angular movement of the camera field of view, and the change in image sharpness, since such attempt, etc. When indexed by such parameters, the table outputs previously-stored data indicating the processing budget and/or processing intensity to be applied in those particular circumstances.

Still another implementation of the marshal module 18 takes the form of a decision tree governed by conditional logic statements that lead, in each set of circumstances, to a terminal node dictating what processing should be applied in those circumstances. For instance, one path through the tree may be as follows:

IF the prior watermark decoding attempt was unsuccessful;
AND IF the image quality has improved since the prior attempt;
AND IF the angular movement of the camera field of view has changed more than 4 degrees since the prior attempt;
AND IF the probability of successful detection of the buffered data is assessed to be greater than 0.6;
THEN attempt watermark detection using the top 3 candidate parameter estimates.

Desirably, system 10 is configured to operate with multiple differently-configured recognition modules (signal detectors). One may be a 1D barcode detector; another may be a 2D barcode detector; another may be a digital watermark detector; another may be a detector that senses a logo on packaged food items triggering a link to nutritional information; another may be an OCR engine; another may be a convolutional neural network image recognizer, etc. The content data processing module 16 typically assesses, separately, the likely presence of each type of detectable information in buffered imagery, and may produce a respective probability for each type of detectable information. The marshal module 18 can then separately control invocation and parameterization of each different type of detector (optionally employing a different threshold value in determining whether the probability of successful detection is large enough to warrant activation).

In some implementations, separate content data processing modules 16 and marshal modules 18 can be provided for the differently-configured signal detectors.

Moreover, each of these detectors may be instantiated with plural different configurations. The 1D barcode extractor, for example, may be configured for EAN-13, EAN-8, Code128, ITF-14, or Code39, barcodes, etc. A 2D barcode extractor may be configured for a QR code, a Data Matrix code, a PDF417 code, an AZTEC code, etc.

Likewise, a watermark detector can be configured to examine different blocks within a buffered frame of imagery. Or it may be configured to examine excerpts of buffered imagery at different scales (e.g., in anticipation of imagery captured from different camera-subject distances). Or to decode payload data encoded by localized variations in luminance, or by localized variations in chrominance. Or to decode payload data encoded using different spreading keys, or having other protocol parameters. Or to decode imagery by applying different perspective distortions. Etc. Again, the content data processing module 16 (or plural such modules) can separately assess the likelihood of successful extraction for each such configuration, and the marshal module 18 (or plural such modules) can likewise invoke each configuration separately.

Figure 1A:
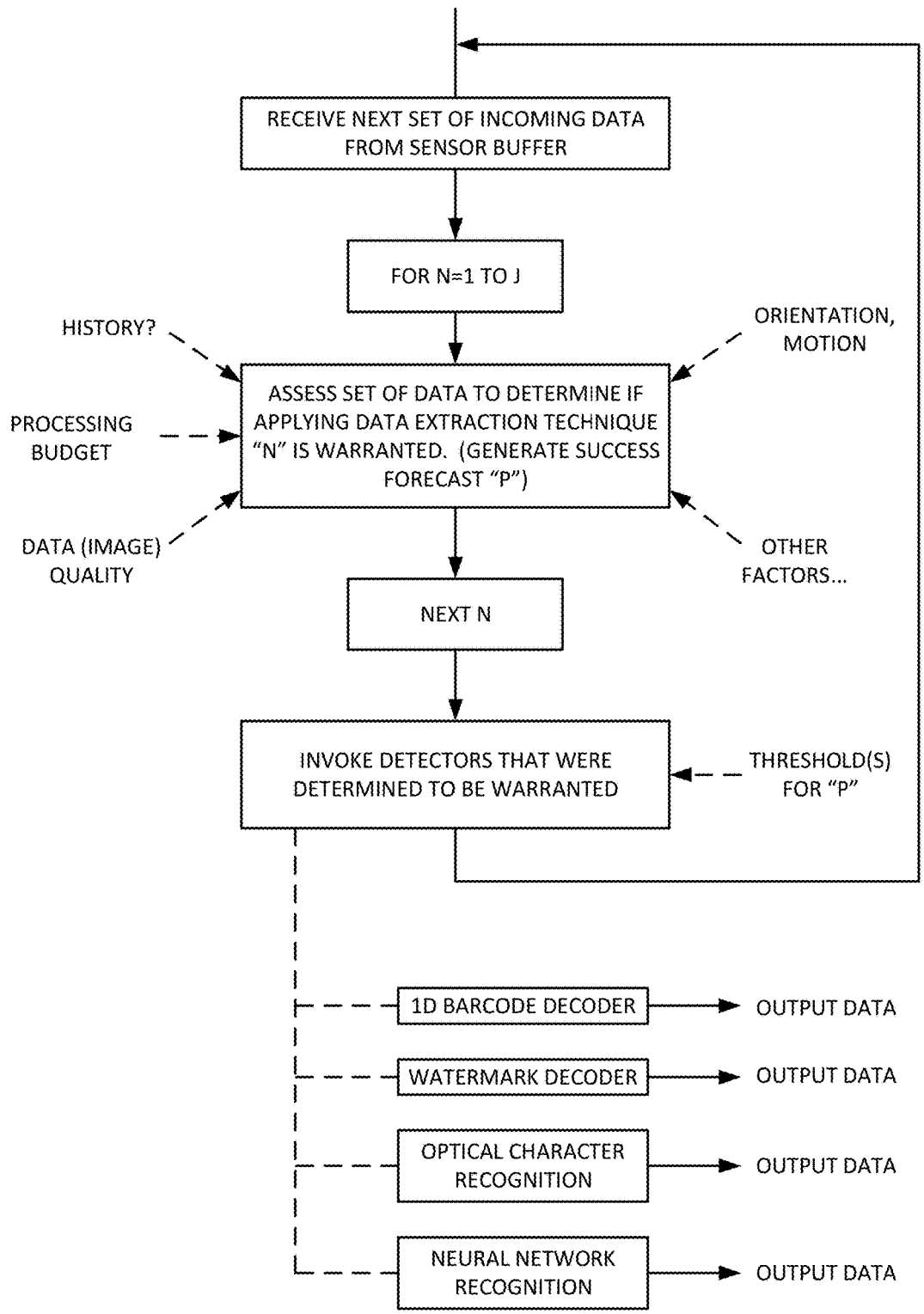
FIGS. 1A and 1B are flow charts of methods employing certain aspects of the present technology.
Figure 1B:
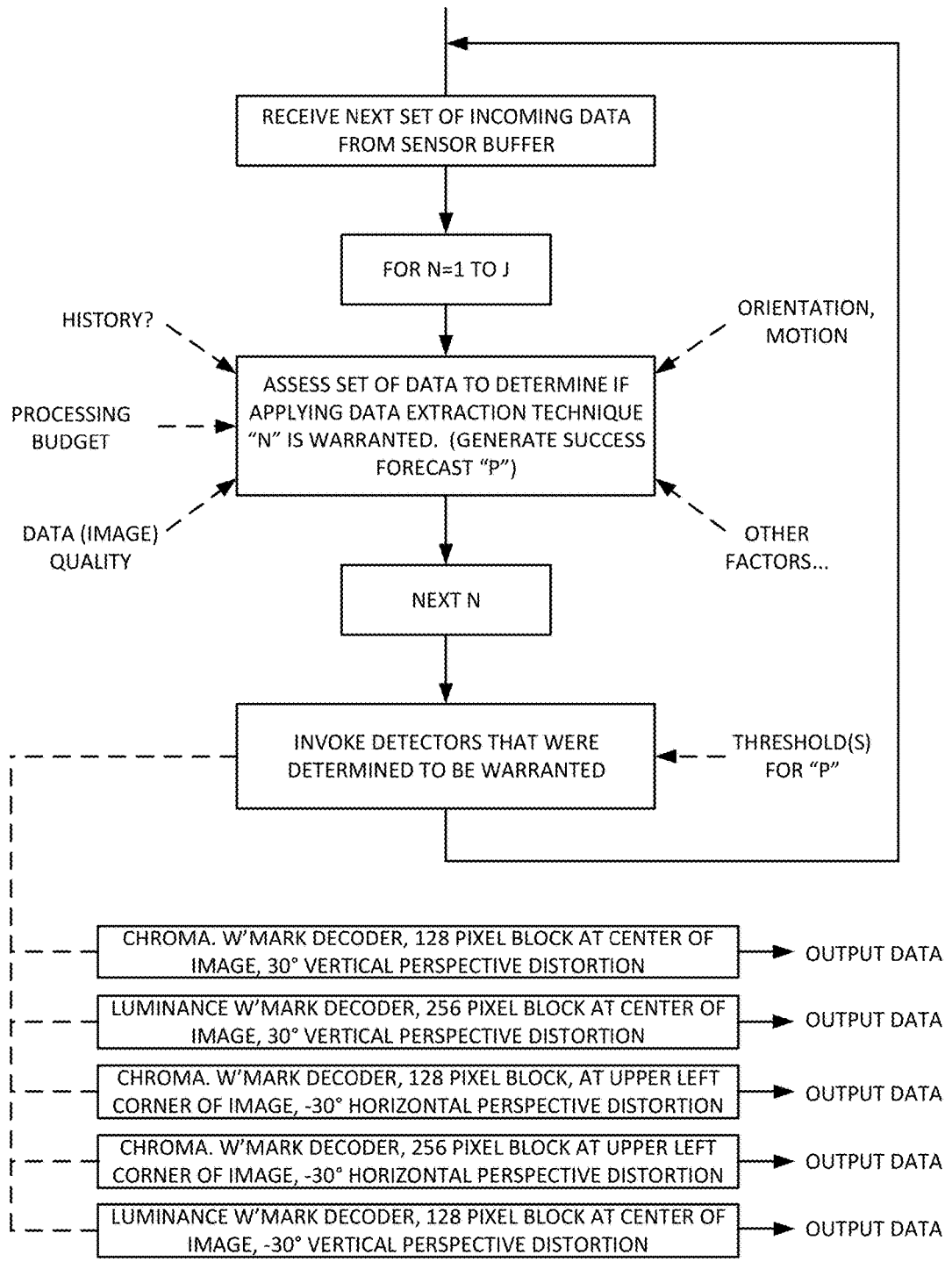

FIGS. 1A and 1B are flow charts of exemplary methods of the sort described above, illustrated in the context of J different detection modules. (While FIG. 1B shows multiple watermark detection modules, each differently parameterized, in actual practice only one, or a few, watermark detection modules may be employed, each of which may be employed multiple times, with each use employing a different set of parameters.)

Figure 2:
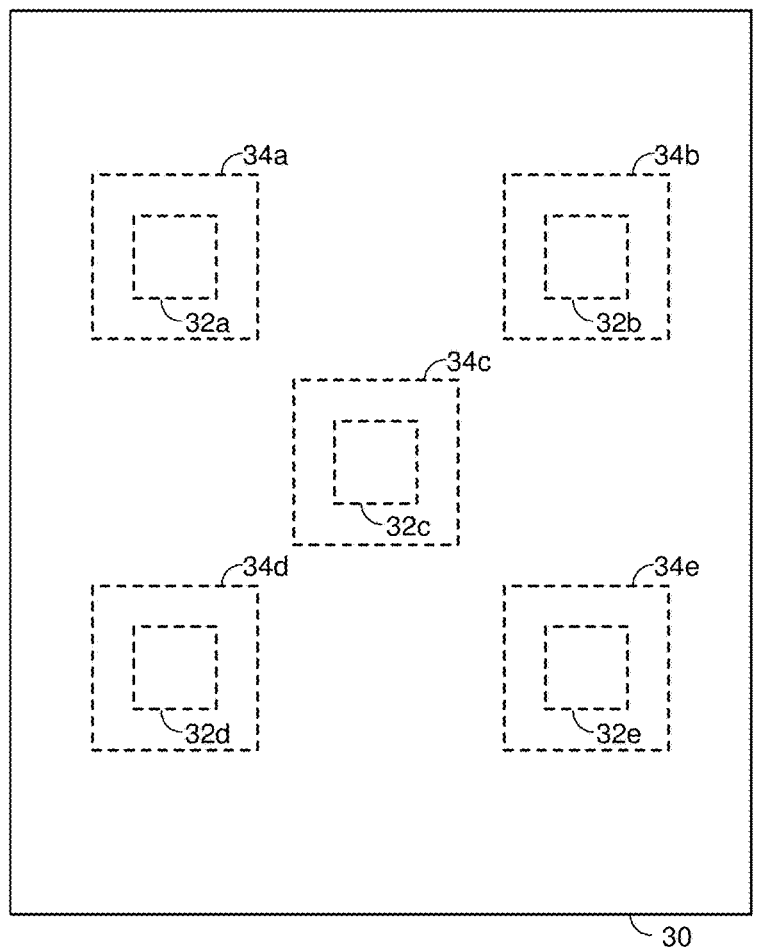
FIG. 2 illustrates that a watermark decoder can be configured to extract data from blocks of different placements, and different scales.

FIG. 2 illustrates the just-referenced concept of a watermark detector configured to analyze different blocks within a buffered frame of imagery, and at different scales. This figure shows 10 different watermarks that might be analyzed for watermark data within the buffered image frame 30; five smaller pixel blocks 32*a*-32*e* (e.g., 128×128 pixels) and five larger pixel blocks 34*a*-34*e* (e.g., 256×256 pixels).)

Figure 3:
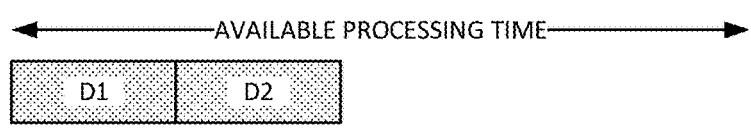
FIG. 3 illustrates a prior art technique of applying differently-configured detectors to sensor data.
Figure 4:
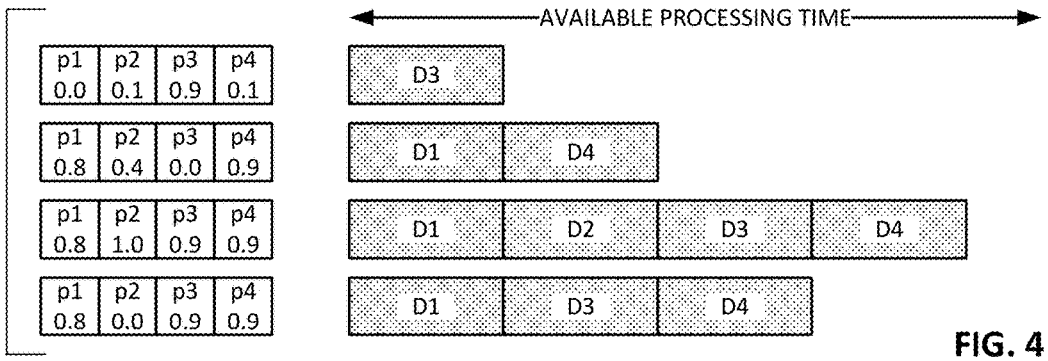
FIG. 4 illustrates one aspect of the present technology.
Figure 5:
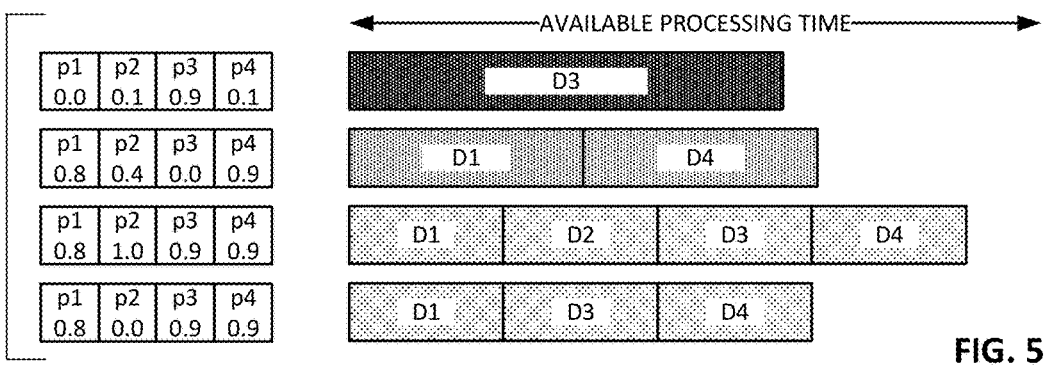
FIG. 5 illustrates another aspect of the present technology.
Figure 6:
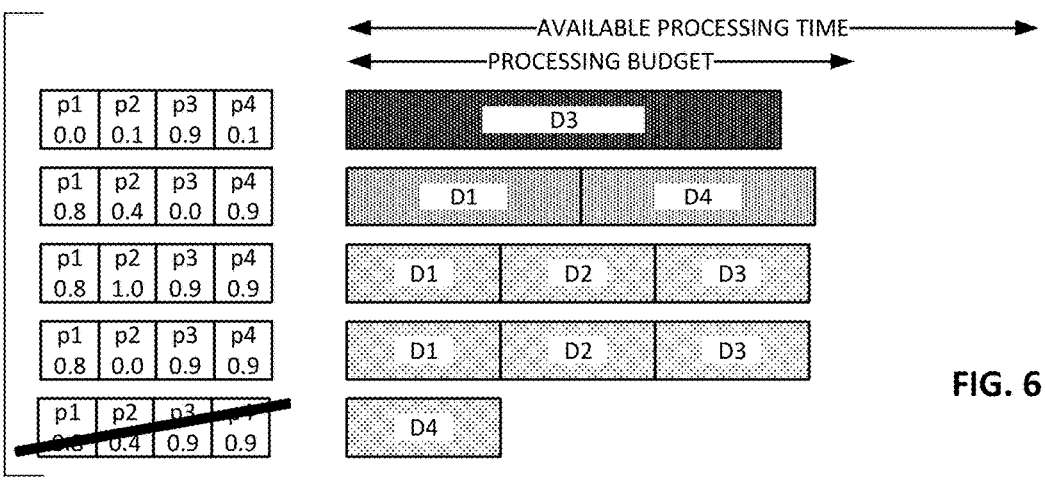
FIG. 6 illustrates still another aspect of the present technology.

FIGS. 4-6 show exemplary operations of system 10, while FIG. 3 shows exemplary operation of the prior art. Each row in these figures illustrates processing of one data buffer (e.g., one image frame, one audio packet, etc.). Successive rows represent successive data buffers (e.g., successive frames of imagery).

FIG. 3 illustrates the case in which a prior art system has identified that buffered imagery includes two regions that hold promise for watermark successful watermark detection. The system applies a first watermark extraction process (D1) to the first region, and a second watermark extraction process (D2) to the second region. As noted earlier, the prior art operates in a binary fashion—a process is applied or it isn't. There is no throttling of intensity or processing budget.

In FIG. 4, the system includes four different detectors, such as a watermark detector (D1), a barcode detector (D2), an OCR module (D3), and a logo detector (D4). Module 16 produces assessments (p1-p4) respectively corresponding to the estimated probability of success for each of these detectors. With each successive frame of captured imagery that passes through the buffer 14, these probabilities change.

In the first row of FIG. 4, the system has assessed a 0.9 probability that the OCR module will successfully decode information from the buffered imagery. The success probabilities for the other detectors are all much smaller (i.e., 0 or 0.1). In this circumstance, the marshal module invokes only the OCR module (D3).

In the second row of FIG. 4, corresponding to the next-buffered frame, the probabilities have changed, indicating the watermark detector and the logo detector have better-than-even odds of successfully extracting information. The marshal module thus invokes these two detectors.

In the fourth row, the probabilities have changed again, indicating that all but the barcode decoder are likely to successfully extract information; each is correspondingly applied to the buffered data.

In the third row, the system assesses that all of the detector modules are likely to succeed in their efforts, and each is correspondingly activated.

For expository convenience, the just-reviewed example considered only the probability p of successful data extraction, in determining whether to invoke a corresponding detector. The other contextual factors that could influence the marshal module 18 in its decision making (as discussed above) were disregarded. Moreover, the probability p was compared against a fixed threshold (i.e., 0.5) in determining whether activation of a detector was warranted. In actual practice, one or more contextual factors are typically considered, e.g., in varying the threshold against which p is compared. (One such contextual factor is the interval of time that has elapsed since a detector last succeeded in producing a detection. Another is battery charge remaining. Etc.) Moreover, there may be a different threshold for each detector, with each threshold being varied based on contextual factors.

Also, as noted, the detectors D1-D4 may differ in degree more than form. For example, detectors D1-D4 may all be watermark detectors—implemented to examine different blocks of pixels within the buffered image frame, or to examine blocks of pixels of different size (scale) within the buffered image frame, or to attempt decoding with four different estimates of scale/rotation/translation, or with different perspective counter-distortions, or with various luminance and chrominance encoding methods, etc.

FIG. 5 considers the same four successive buffers of input sensor data, with the same respective probabilities p, but introduces variable processing intensity.

In the first row of FIG. 5, detector D3 is assessed to have a success probability p of 0.9, whereas the others are all 0.0 or 0.1. In this case, the system can dedicate its effort solely to that one detector, and may operate at an intensity that would not be practical for two detectors operating within the allotted time (e.g., for thermal reasons). This high level of intensity is represented by the dark level of shading in the D3 block.

In the second row of FIG. 5, there are two detectors whose probabilities are assessed as greater than 0.5. The system 10 here applies reduced intensity—compared to the single invoked detector of the first row—but still more intensity than is applied in the third and fourth rows, when three and four detectors are invoked.

The third and fourth rows of FIG. 4, although involving different numbers of detectors, are depicted as applying the same level of intensity to each detector. This is due to the fact that detection effort may be controllable only in discrete steps, and there may be no set of discrete levels that allows, e.g., the four detectors in the third row to apply three-fourths of the intensity relative to the three detectors in the fourth row.

FIG. 6 is similar to FIG. 5. However, in this arrangement, a processing budget is fixed in advance. The fourth row (buffer) was found to merit invocation of four detectors. Yet the processing budget would have been exceeded by running all four. Accordingly, one of them is not invoked until the next buffer (frame) period. That buffer, the fifth, is thus skipped, so that processing of the fourth buffer can conclude. (The third and fourth buffers are transposed in the diagram.)

Figure 7:
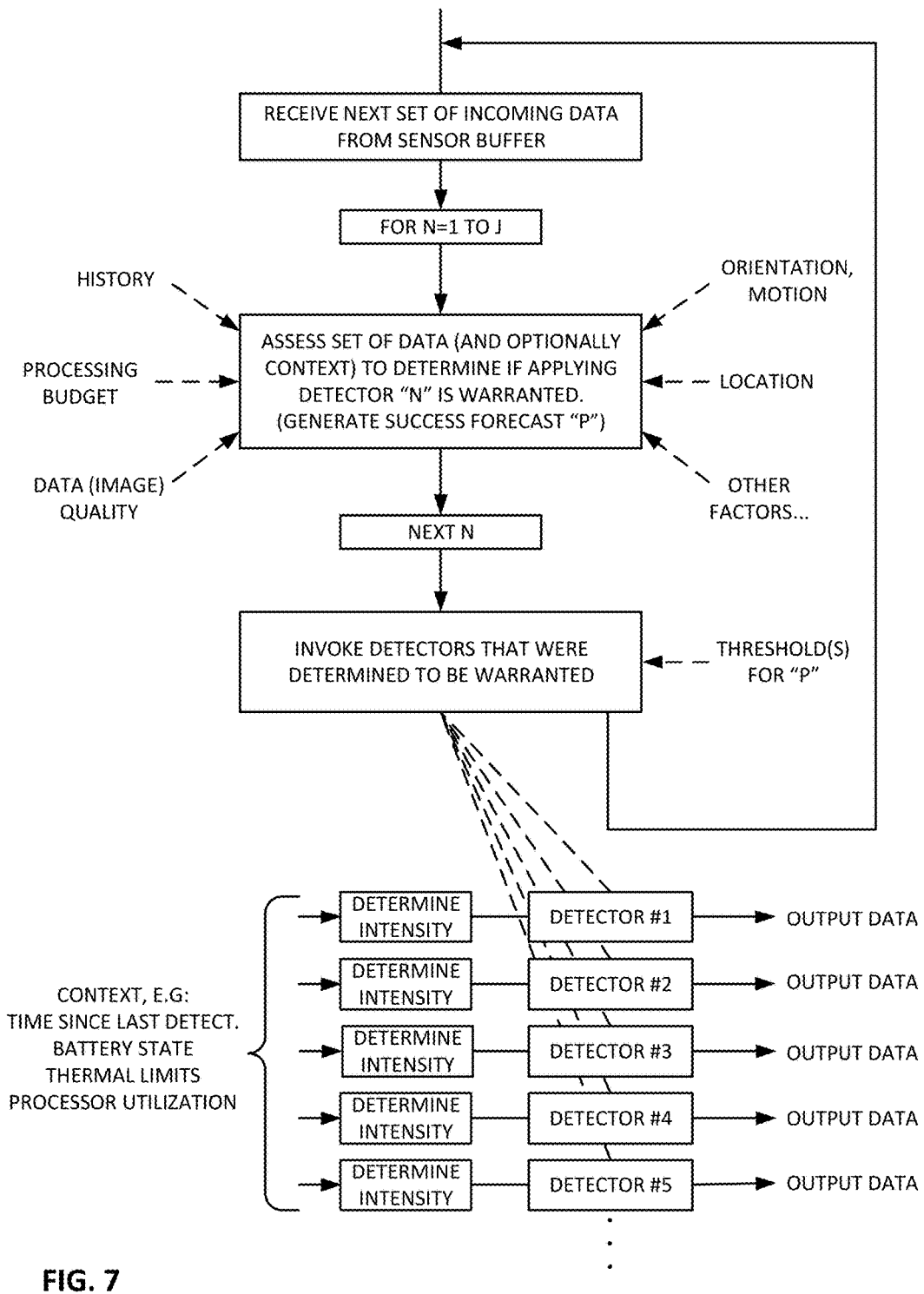
FIG. 7 is a flow chart of a method employing certain aspects of the present technology.

FIG. 7 illustrates an exemplary method of the sort detailed above.

Figure 8B:
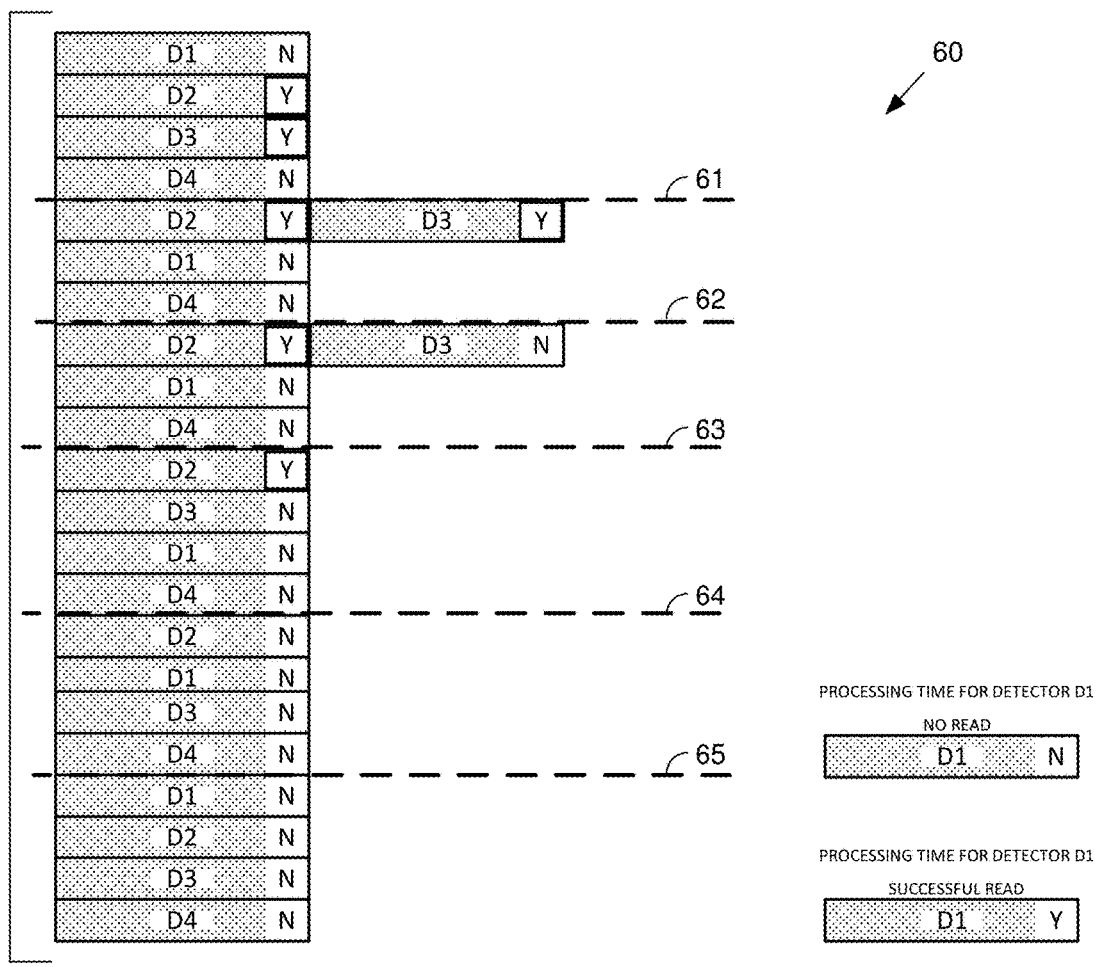
FIG. 8B depicts an illustrative operation of a system using aspects of the FIG. 8A code.

FIG. 8A is pseudo-code for a different implementation 60, also illustrated in FIG. 8B. This implementation is particularly advantageous in severely battery-limited applications, or when the processing system is concurrently handling other operations that are processor-intensive—leaving little residual capability for the detailed recognition operations.

As before, each row in FIG. 8 corresponds to one image frame in the sensor buffer 14. Again, four detectors are contemplated, D1-D4 (although a greater or lesser number can naturally be used).

Operation of system 60 starts in round-robin fashion, first applying detector D1 to the first-buffered image. In this case, the detector fails its recognition task—indicated by the "N" in the right of the top D1 box. The second detector, D2, is then applied to the second-buffered image, and succeeds in its recognition task—indicated by the "Y" in the right of the top D2 box. D3 and D4 are successively applied to the third- and fourth-buffered frames respectively. D3 succeeds, and D4 fails. A dashed line 61 then-follows, indicating all four detectors have been applied to buffered imagery, completing an initial round of detector operations.

A second round of detector operations then follows—in the three rows extending down to the second dashed line 62. This second round of operation begins by re-running the detectors that succeeded in the first round: D2 and D3. They are both applied to a single buffer of imagery: the fifth buffer. In the depicted example, both D2 and D3 again succeed ("Y"). Then-follows the least-recently applied detector, D1, followed by the next-least-recently applied detector, D4.

Thus, in this second round of detector operations, the previously-succeeding detectors are applied to a single image buffer, and the previously-failing detectors are each applied to their own successive buffers.

A third round of detector operations ensues—in the three rows extending down to the third dashed line 63 in FIG. 8B. Again, since detectors D2 and D3 succeeded in the previous round, they are again given priority, and both are applied to the next buffer of imagery. In this case, D2 succeeds and D3 fails. The detectors that failed in the previous round, D1 and D4, are then applied—with D1 going first as the least-recently-applied failing detector.

The fourth round of detector operations follows—this time comprising four buffers of imagery (down to the fourth dashed line 64). Four buffers are used because only one detector from the previous round succeeded, so the first buffer in the fourth round is processed by it alone, i.e., D2. It succeeds. The three detectors that failed in the previous round are then applied to successive buffers, again with the least-recently-applied going first, i.e., D3, D1 and D4.

A fifth round of detector operations then-follows, down to the fifth dashed line 65. Again, four buffers are examined in this round, for the same reason that four buffers were examined in the fourth round. In this round, all detectors fail.

The process continues in this fashion, applying the least-recently-used detector to each successive buffer, unless one or more detectors in the previous round succeeded—in which case those succeeding detectors are all applied to the first buffer processed in a round.

Figure 8C:
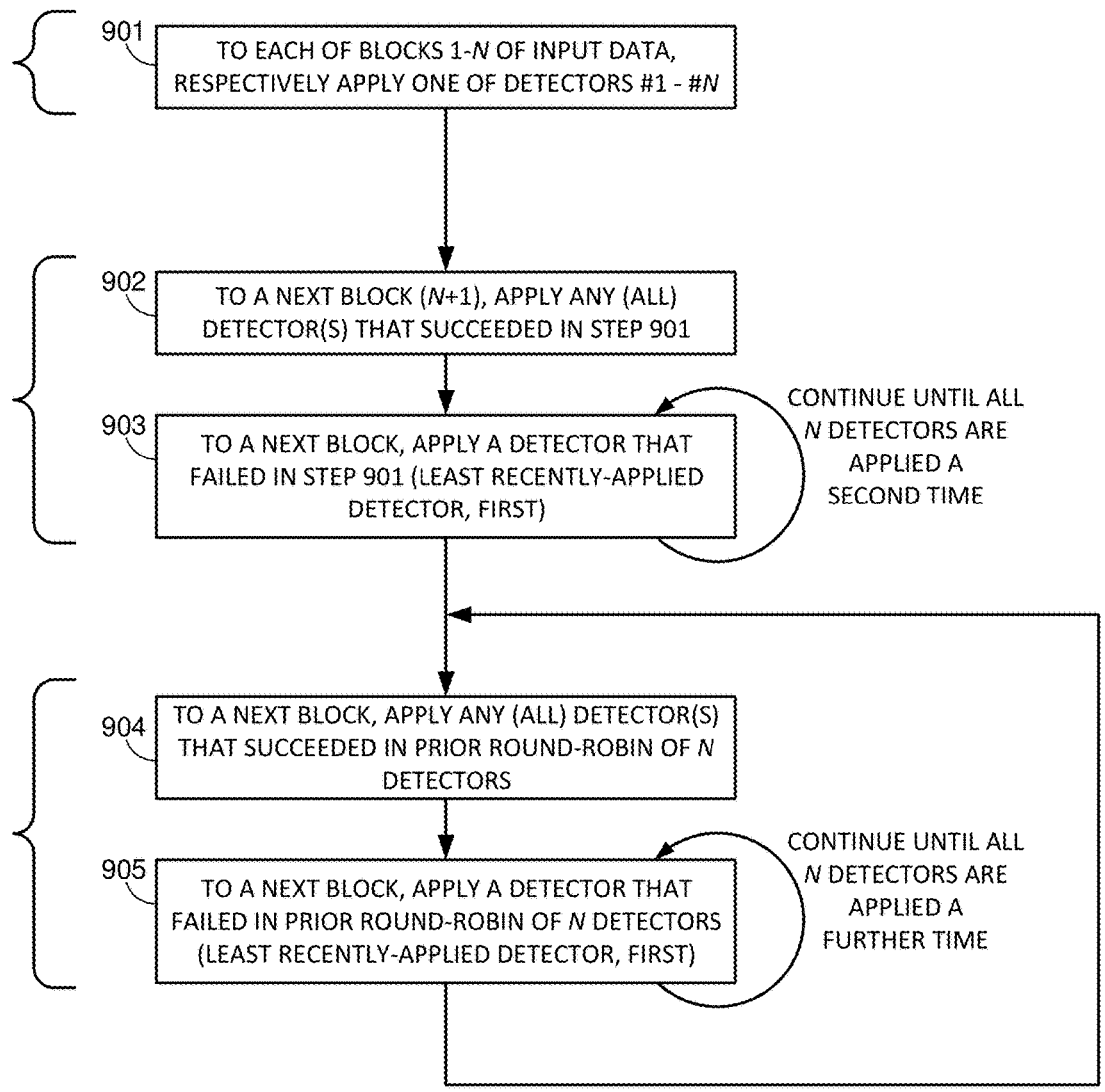
FIG. 8C is a flow chart of a method employing certain aspects of the present technology.

FIG. 8C illustrates the above-detailed algorithm in flow chart style. Each round-robin (of applying N detectors) is demarked with a bracket.

The foregoing discussion, and figures, made no reference to assessment of the buffered image data by module 16 of FIG. 1, nor to any decision-making by marshal module 18. These modules can be employed in such embodiment (e.g., as depicted by the flow charts of FIGS. 1A and 1B), acting to gate or throttle operations of each detector, e.g., attempting a full detection operation only if the buffered imagery appears promising, and/or if the marshal module determines that such detection should be undertaken (and how it should be undertaken) in the current context. Similarly, the variable intensity operations, and CPU-limited operations, discussed above in connection with FIGS. 5-7 can likewise be applied in the just-discussed arrangement 60 of FIGS. 8A-8C.

It will be recognized that the described system 60 is extremely parsimonious in resource requirements—often applying just one detector per buffered image. Yet, each of the N detectors is applied at least once every N processed buffers, assuring that any extractable signal—of whatever type—is extracted promptly. If the buffered images are rich in detectable signals, the detectors are applied more quickly, e.g., with all detectors applied in the span of three, two, or even one buffer.

FIGS. 9A and 9B show pseudo-code for a different implementation 66, also illustrated in FIG. 10A. It has similarities and differences with just-discussed embodiment 60. A significant difference is its emphasis on performance (while still offering economy of processor and battery resources compared to methods that apply all promising detectors to all buffered frames).

Referring to FIG. 10A, embodiment 66 starts like embodiment 60—applying detector D1 to the first-buffered frame. As before, this first detector fails on the first frame. (Although the buffered frames appear to yield similar results between FIGS. 10 and 8, they are not exactly identical, because different examples were chosen to highlight certain differences in operations of the two embodiments.)

The second buffered frame is analyzed, in embodiment 66, by detector D2, which succeeds. In this embodiment, such success leads the successful detector(s) to be immediately re-applied to the next-buffered frame—together with the next detector in a round-robin sequence: detector D3. As shown by the third row in FIG. 10, both of these detectors D2 and D3 succeed.

Again, in this embodiment, success of detectors on one frame leads to their re-application to the next frame—so both D2 and D3 are applied to the fourth-buffered frame, together with the least-most-recently applied detector, D4. Detectors D2 and D3 again both succeed, so are applied again to the fifth buffered frame, this time in conjunction with the least-most-recently applied detector, which is now D1.

Detectors D2 and D3 again are successful in extracting information from the fifth-buffered frame, so are applied again to the sixth-buffered frame, this time in conjunction with the least-most-recently applied detector, which is again D4. Detectors D2 and D3 are once again successful on this sixth frame, and so are applied again to the seventh-buffered frame, now in conjunction with detector D1. Here, however, detector D3 fails. So in the eighth-buffered frame, only successful detector D2 is re-applied, this time in conjunction with detector D4.

In that eighth-buffered frame, detector D2 is again successful, so is re-applied for the ninth-buffered frame, together with detector D1. Again, detector D2 succeeds, so is reapplied for the tenth-buffered frame. This time, however, the least-most-recently applied detector is D3, so it is also applied to the tenth-buffered frame.

In this tenth-buffered frame, neither of the applied detectors D2 or D3 is successful, so neither is re-applied to the eleventh-buffered frame. Instead, just the least-most-recently applied detector, D4, is applied to this eleventh frame. For the remainder of the depicted frames, each applied detector fails, leading to application of just the least-most-recently applied detector to the next frame. This causes detectors D1, D2, D3 and D4 to be successively applied to successively-buffered image frames.

Figure 10B:
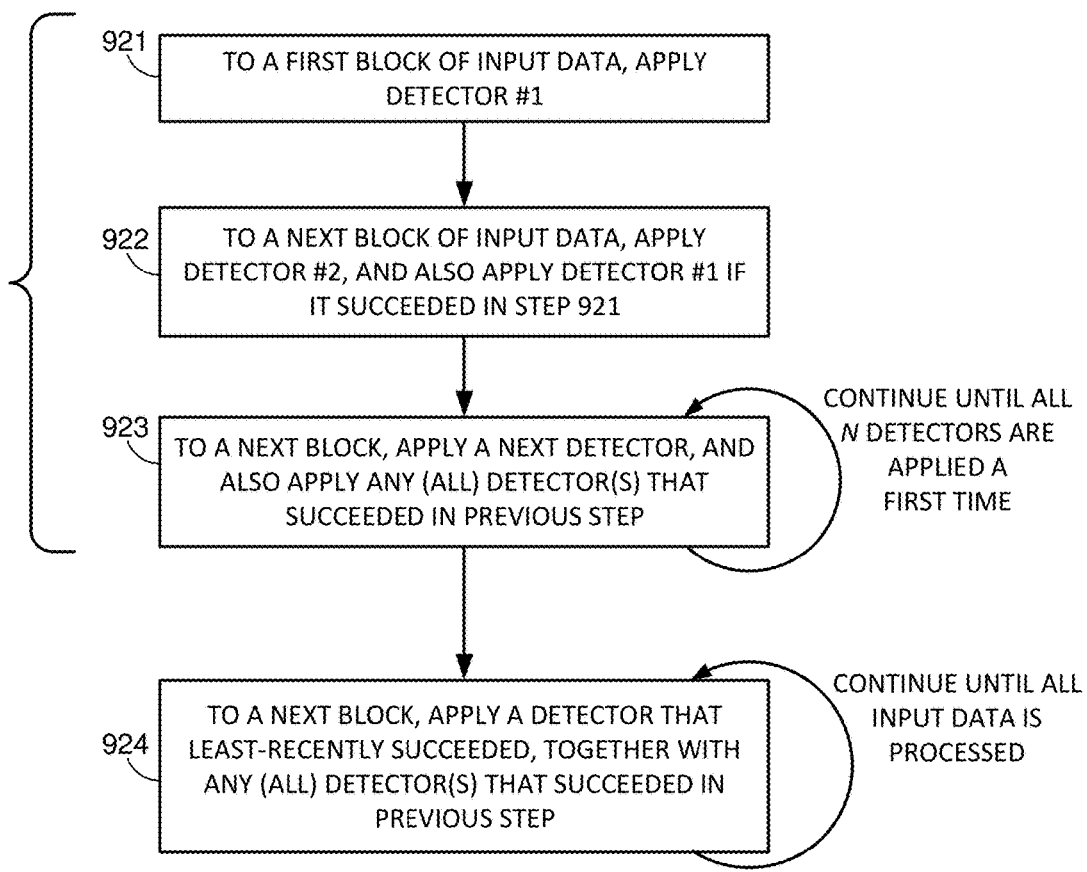
FIG. 10B is a flow chart of a method employing certain aspects of the present technology.

Such arrangement is illustrated by the flow chart of FIG. 10B.

As with the earlier-described arrangement 60, the foregoing discussion has omitted reference to assessment module 16 and marshal module 18 of FIG. 1. Again, in one implementation, before any of the detectors of FIG. 10 is applied to a buffered image frame, module 16 first assesses the likelihood that such detector will succeed in its undertaking, and/or module 18 determines whether the detector should actually be applied in the current context, as described earlier. Arrangement 66 assumes that these conditions—if tested—are both passed. In a different implementation, one or both of modules 16 and 18 is omitted, and the code of FIGS. 9A and 9B simply governs extraction operations.

And as with FIGS. 1A, 1B and 8B, the referenced detectors can be of different types (e.g., 1D barcode vs. 2D barcode), or of different configurations (e.g., QR code vs. Data Matrix code; watermark block in one position vs. watermark block at a different position; watermark block at one scale vs. watermark block at a different scale; etc.).

The just-discussed arrangements 60 and 66 give priority to detectors that were recently successful in extracting information from buffered content data. These arrangements can be modified to try detectors of different types and different configurations, and give priority to the types and configurations that are found to be successful.

Figure 11:
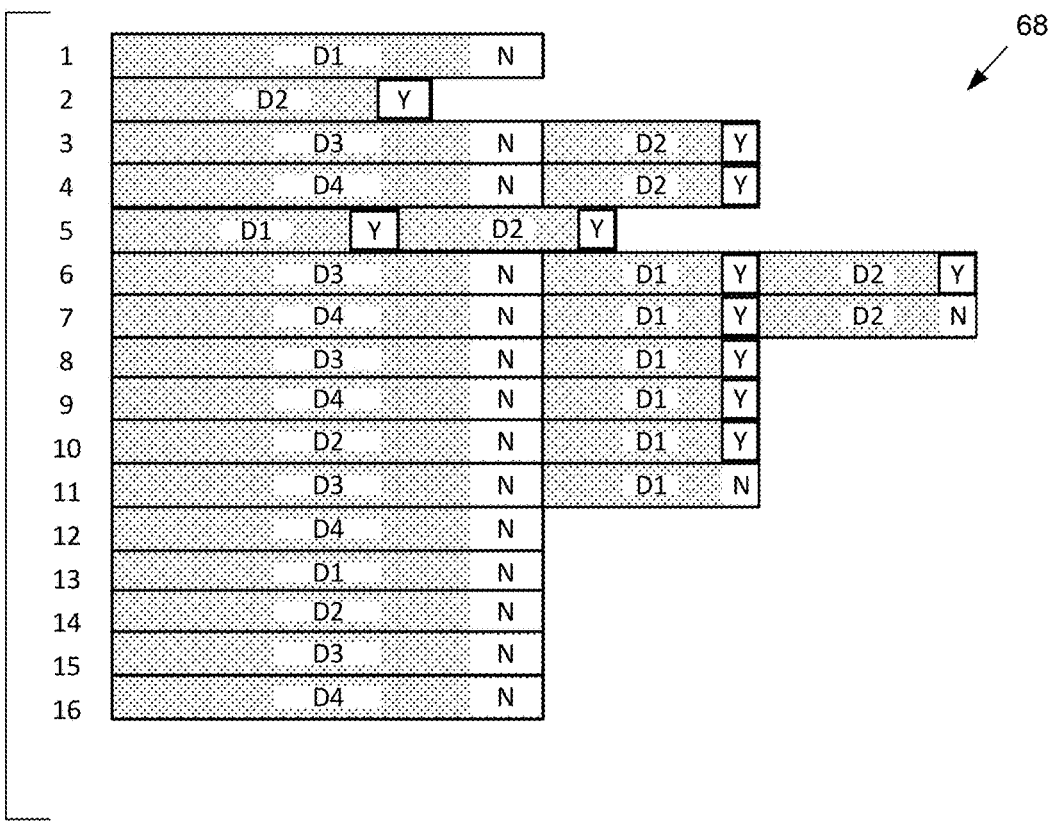
FIG. 11 depicts an illustrative operation of still another system employing aspects of the present technology.

Consider the arrangement 68 shown in FIG. 11, which is based generally on arrangement 66 of FIG. 10A.

In the top row, detector D1 is applied to the first buffered image frame. However, it churns longer than it did in the top row of FIG. 10. This is because it is trying different configurations in an attempt to successfully extract data. For instance, it may try various block locations, or block sizes, or perspective warps. These configurations are all defined by a list data structure, stored in system memory. All of these configurations fail when applied to the first buffered image frame.

In the second row, detector D2 is applied to the second buffered image frame. It proceeds similarly, trying different candidate configurations defined by its respective list. If a 1D barcode detector, for instance, it may look first for EAN-13 symbology, and then Code128, and so on through a list of different configurations. In this example, it fairly quickly finds a configuration that succeeds (e.g., Code128), so doesn't try other configurations remaining in its list.

The third row depicts analysis of the third buffered image frame by two detectors: the detector D2 that just succeeded (i.e., the 1D barcode, in its Code128 configuration), and D3.

D3, as with D2 and D1 in the preceding rows, tries different of its possible configurations—looking for one that succeeds. None does. However, detector D2—with its earlier-successful Code 128 configuration, succeeds again. Because it is not trying multiple configurations, it takes less processing time (explaining the smaller size of the D2 processing box compared to the D3 processing box, and the D2 processing box in the preceding row).

As in the FIGS. 10A/10B example, a successful detector(s) is again applied to the next buffered data, so D2—configured for Code128—is again applied to the fourth buffered frame of image data. It again succeeds. Detector D4—the least-recently-used detector—is also applied, and also churns through its available configurations.

In the fifth row, the least-recently-used detector D1 is again applied, and in trying its different configurations, finds one that succeeds, e.g., a digital watermark at location 34b in FIG. 2, with 256×256 block size. Detector D2 in its successful configuration is again re-applied, and again succeeds.

Since both D1 and D2 succeeded with the fifth set of buffered data, they are re-applied with the sixth set of buffered data. Both succeed. Least-recently-used detector D3 is also applied. It tries its various configurations, but all fail.

Detectors D1 and D2 are again re-applied to the seventh set of buffered data, with their previously-successful configurations. Least-recently-successful detector D4 is also applied, and tries its list of configurations. Only D1 succeeds.

The successful configuration of D1 is re-applied to the eighth set of buffered data, together with least-recently-successful detector D3. It tries its listed configurations but all fail, whereas D1 again succeeds.

This is repeated with the ninth and tenth sets of buffered data, with D1 repeatedly succeeding, and least-recently-used detectors D4 and D2 respectively trying their various configurations, but failing.

In the eleventh row, successful detector D1 is reapplied, but its previously-successful configuration fails. Detector D3 is also attempted, buts its various configurations all fail.

For the twelfth and successive rows, since no detector succeeded, the system simply steps through one detector per frame, per the least-recently-used protocol, trying each with its various configurations.

In some embodiments, a detector may have so many different configurations that it is not practical to try all against a given buffer of content data. In such case, different configurations can be tried until a processing-time counter expires (e.g., 5 milliseconds). A pointer is then stored, indicating the point in the configuration list where un-tried configurations start. The next time that detector runs, it can pick up at the pointed location, and try further configurations—looping back to the beginning if time allows. (Of course, a content data processing module 16 may indicate that a certain configuration of detector has a low probability of succeeding, and a marshal module 18 may consequently not even to try to run such detector. Thus, not all configurations may be candidates to run.)

Just as processing-time limitations can be employed in the FIG. 11 embodiment (as originally introduced in connection with FIG. 6), variable processing intensities can also be employed (as originally introduced in connection with FIG. 5). For example, if a detector configuration succeeded with the just-processed buffer, then that detector may be run with different intensity (e.g., more intensity) than another detector applied to the same image buffer, which has not recently succeeded.

In a variation of the FIG. 11 implementation, when a detector succeeded with an immediately-preceding buffer of content data, but the same configuration fails with the current buffer of data (as was the case with detector D1 in row 11 of FIG. 11), that detector can immediately return to the mode of trying other configurations without waiting for a later buffer of data. Such other configurations can be tried beginning with the configuration from its list that immediately follows the just-tried-but-failed configuration. More processing is entailed in this variant (and more battery consumption), but in certain applications this is the preferred choice.

In some implementations of the present technology, there may be dozens, or hundreds (or more) of different types/configurations of detectors that may be run. Further battery economy can be achieved by identifying subsets of these types/configurations that are candidates to run in different contexts. Or, said another way, there may be subsets that need not be considered for running in particular contexts. Such arrangements are introduced in applicant's publication 20130150117.

To illustrate, if location data indicates the user is at a work location, and date data indicates it is a work day, the system may decide that music-recognition is not useful. So detectors associated with music recognition are removed from the lineup of available detectors to which the arrangements of FIGS. 8A-11 are applied. If driving in a car, the system may decide that facial recognition and optical character recognition need not be considered, so these detectors are left idle. Rules establishing contextually-defined subsets of detectors that should, or should-not, be available, can be expressly defined (e.g., by a decision tree comprising conditional logic statements that lead, in each set of circumstances, to a contextually-specific list of detectors/configurations), or they can be gleaned by observation of the user and others (e.g., others who are demographically similar, or who are social network friends)—determining which varieties of detectors are used (or not used) in different contextually-defined scenarios.

Just as different subsets of detectors may be appropriate for use in different contextual scenarios, different strategies of their operation (e.g., FIGS. 8A-11) may likewise be appropriate in different contextual scenarios. The system (e.g., a smartphone) can switch between different detector strategies based on context factors such as location, day of week, battery charge remaining, wireless connectivity and cost, etc. Or a user interface may allow a user to manually switch between different strategies as circumstances warrant.

In one particular implementation, the above-described functionality is provided as an operating system service or middleware layer of software, and operates in conjunction with a collection of software detector modules with which the system is provisioned. (Content data processing modules 16 and marshal modules 18 specific to the provisioned detectors can also be provided.) Such software can instantiate one or more message queues, to which successful results of extraction operations are posted, and to which other software services (e.g., applications) can subscribe. (Such a message queue arrangement for content recognition is detailed in applicant's publication 20140357312, as are other arrangements, e.g., based on publish/subscribe functionality.)

Figure 12:
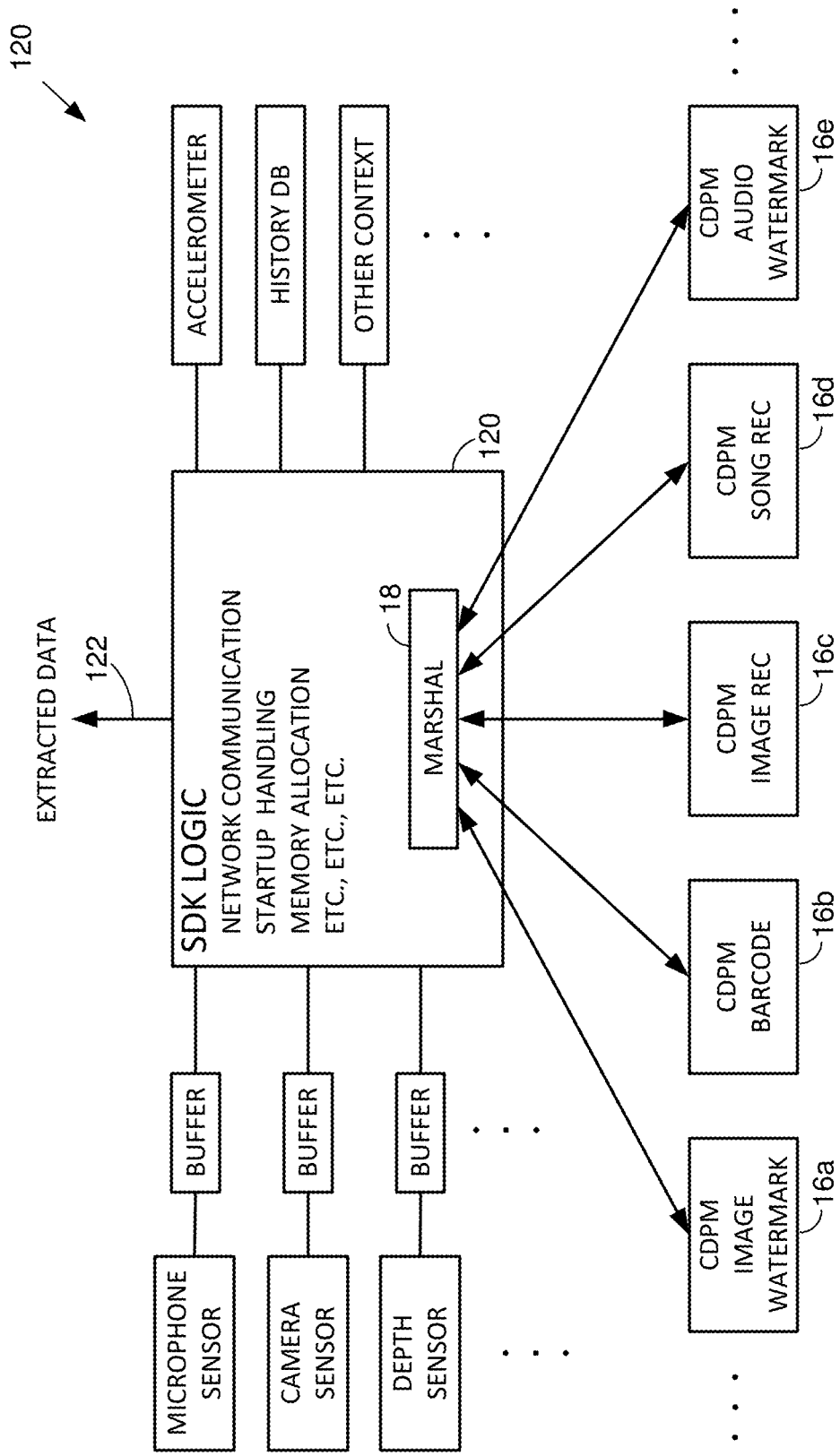
FIG. 12 illustrates one form by which a multi-sensor system employing aspects of the present technology can be implemented.

FIG. 12 shows a representative implementation including an SDK 120, in which a single marshal module 18 is in communication with plural content data processing modules (CDPMs) 16a-16e, each associated with a different type of extraction operation. From the left, the SDK has access to various buffered sensor data, and from the right, the SDK has access to various context data. Like in the examples earlier discussed, the context data informs the marshal's decision of when to pass buffered data to one or more content data processing modules, and how such modules should handle such data (e.g., in terms of CPU processing budget, intensity, etc.). Extracted data is passed to an output 122 (e.g., a message queue).

The FIG. 12 arrangement includes a depth (distance) sensor. Among other applications, the 3D information provided by such sensor provides an important clue as to the scale at which detectors should anticipate that imagery will be depicted. For example, many watermarked items are characterized by a watermark block size that is originally 1.7 inches on a side. By knowing the distance to the item, the system can estimate the scale at which the block will be represented in the captured imagery—facilitating detection. In like fashion, data from such a 3D sensor indicates the inclination of a depicted surface relative to the camera. Again, the present system can estimate the perspective distortion that will arise by reason of such inclination, and counter-distort the imagery accordingly—again facilitating detection.

The described software can be configured as best suits the hardware and application with which it is used, e.g., a consumer smartphone, an industrial computer vision system that monitors operation of a packaging line, a scanner for a point of sale product recognition in a grocery store, a robot for picking or tallying inventory, etc. Data specifying the application can trigger the software to apply different rule sets. For example, in a consumer smartphone, if a watermark detection occurs in one image frame, no further watermark detection is attempted for two seconds or until the camera moves, whereas if in an industrial computer vision system, if a watermark detection occurs in one image frame, a further watermark detection is nonetheless attempted on the very next frame, etc.

Concluding Remarks

Having described and illustrated different aspects of the technology with reference to various examples, it should be recognized that such examples do not limit the scope of the technology.

For example, while the foregoing discussion has focused on recognition of imagery, the same principles are likewise applicable to other operations provided on other data—such as audio, depth map information, beacon signals (e.g., for localization), etc. A single service (e.g., system 10) can support extraction operations on multiple such types of data, or dedicated services can be provided for each.

Although assessment operations may output a range of output values (e.g., values of a probability function p that are continuously variable, or that range between 0 and 1 in steps of 0.1), others may provide a binary output: go/no-go.

As used herein, a low intensity operation (e.g., for assessing whether it is worthwhile to attempt to extract information from captured content) means that an operation requires less than 50%—and preferably less than 10%, 5% or even 1%—of the effort (e.g., processing time, clock cycles, energy consumption, etc.) that would be required to fully perform the later operation that it normally gates (e.g., extracting watermark or barcode information from the captured content).

It will be recognized that the "intensity" of different extraction operations can be varied in different ways, depending on the particular types of operations involved. As noted, for watermarking, one way of varying intensity is varying the number of different numbers of affine parameter sets used in attempting to decode the payload information. For classification-based systems, a way of varying intensity is varying a number of classes into which input content is to be categorized. For example, an image recognition system may classify an image as a dog (e.g., from among 50 different classes), or as a Dalmatian (e.g., from among 1000 different classes). The marshal module can establish, based on current context, how fine a classification is required, and thereby vary the intensity of the recognition operation.

The design of the computing devices used with the present technology is familiar to the artisan. In general terms, each may include one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, one or more microphones, etc., together with software instructions for providing a graphical user interface), interconnections between these elements (e.g., buses), and an interface for communicating with other devices (which may be wireless, such as GSM, 3G, 4G, 5G, CDMA, WiFi, WiMax, Zigbee or Bluetooth, and/or wired, such as through an Ethernet local area network, etc.). Mobile devices are typically also equipped with a variety of motion and pose sensors (collectively referred to as motion sensors), which can include 3D accelerometers, 3D gyroscopes, and 3D magnetometers.

The arrangements detailed above can be implemented in a variety of different hardware structures, including a microprocessor, an ASIC (Application Specific Integrated Circuit) and an FPGA (Field Programmable Gate Array). Hybrids of such arrangements can also be employed, such as reconfigurable hardware, and ASIPs.

By microprocessor, Applicant means a particular type of hardware structure, namely a multipurpose, clock-driven, integrated circuit that includes both integer and floating point arithmetic logic units (ALUs), control logic, a collection of registers, and scratchpad memory (aka cache memory), linked by fixed bus interconnects. The control logic fetches instruction codes from a memory (often external), and initiates a sequence of operations required for the ALUs to carry out the instruction code. The instruction codes are drawn from a limited vocabulary of instructions, which may be regarded as the microprocessor's native instruction set.

A particular implementation of the above-detailed arrangements on a microprocessor involves first defining the sequence of algorithm operations in a high level computer language, such as MATLAB or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

As noted, many microprocessors are now amalgamations of several simpler microprocessors (termed "cores"). Such arrangements allow multiple operations to be executed in parallel. (Some elements—such as the bus structure and cache memory may be shared between the cores.)

Examples of microprocessor structures include the Intel Xeon, Atom and Core-I series of devices. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data (e.g., pixels or pixel blocks). Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to perform watermark decoding from image frames, and programmed tomorrow to prepare a user's tax return, an ASIC structure does not have this flexibility. Rather, an ASIC is designed and fabricated to serve a dedicated task, or limited set of tasks. It is purpose-built.

There are two general classes of ASIC: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of the detailed algorithms offer higher performance, and consume less power, than implementations employing microprocessors. A drawback, however, is the significant time and expense required to design and fabricate circuitry that is tailor-made for one particular application.

An ASIC-based particular implementation of the above-detailed methods begins by defining a sequence of algorithm operations in a source code, such as MATLAB or C++. However, instead of compiling to the native instruction set of a multipurpose microprocessor, the source code is compiled to a "hardware description language," such as VHDL (an IEEE standard), using a compiler such as HDLCoder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to implement the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, a memory (which may be external). By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Altera (now Intel), and the Spartan FPGA from Xilinx.

As with the other hardware structures, implementation of each of the above-detailed algorithms begins by authoring the algorithm in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One structure employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Another hybrid approach, termed reconfigurable hardware by the Applicant, employs one or more ASIC elements. However, certain aspects of the ASIC operation can be reconfigured by parameters stored in one or more memories. For example, a watermark calibration signal can be defined by parameters stored in a re-writable memory. By such arrangement, the same ASIC may be incorporated into two disparate devices, which employ different watermark calibration signals. One may be a smartphone configured with the capability to read watermark-encoded product identifiers hidden in grocery item packaging—which looks for a calibration signal comprised of one particular constellation of spatial frequency signals. A second may be an age verification terminal (e.g., at a liquor store) for reading watermark-encoded birthdate information hidden in a driver's license—which looks for a calibration signal comprised of a second, different constellation of spatial frequency signals. The chips are all identically produced in a single semiconductor fab, but are differentiated in their end-use by different calibration signal data stored in memory (which may be on-chip or off).

Yet another hybrid approach employs application-specific instruction set processors (ASIPS). ASIPS can be thought of as microprocessors. However, instead of having multi-purpose native instruction sets, the instruction set is tailored—in the design stage, prior to fabrication—to a particular intended use. Thus, an ASIP may be designed to include native instructions that serve operations prevalent in a particular application (e.g., oct-axis computation for watermark decoding—as detailed in the incorporated-by-reference documents). However, such native instruction set would typically lack certain of the instructions available in more general purpose microprocessors.

Reconfigurable hardware and ASIP arrangements are further detailed in application Ser. No. 14/842,575, filed Sep. 1, 2015 (now U.S. Pat. No. 9,819,950), the disclosure of which is incorporated herein by reference.

Software instructions for implementing the detailed functionality can be authored by artisans without undue experimentation from the descriptions provided herein, e.g., written in C, C++, MATLAB, Visual Basic, Java, Python, Tcl, Perl, Scheme, Ruby, Caffe, TensorFlow, etc., in conjunction with associated data.

Software and hardware configuration data/instructions are commonly stored as instructions in one or more data structures conveyed by tangible media, such as magnetic or optical discs, memory cards, ROM, etc., which may be accessed across a network.

Different of the functionality can be implemented on different devices. For example, one or more of the detectors cited above may be implemented on one device (e.g., a smartphone), and another may be implemented on another device (e.g., a remote computer, such as in the Microsoft Azure cloud). Thus, it should be understood that description of an operation as being performed by a particular device is not limiting but exemplary; performance of the operation by another device, or shared between devices, is also expressly contemplated.

In like fashion, description of data being stored on a particular device is also exemplary; data can be stored anywhere: local device, remote device, in the cloud, distributed, etc.

The present technology can be used in connection with wearable computing systems, including headworn devices. Such devices typically include one or more sensors (e.g., microphone(s), camera(s), accelerometers(s), etc.), and display technology by which computer information can be viewed by the user—either overlaid on the scene in front of the user (sometimes termed augmented reality), or blocking that scene (sometimes termed virtual reality), or simply in the user's peripheral vision.

Details concerning watermarking are known from applicant's previous patent filings, including U.S. Pat. Nos. 8,401,224, 6,975,744, 6,973,197, 6,912,295, 6,590,996, 6,345,104, 6,307,949, 6,122,403, 20100150434, 20120046071, 20120078989, 20140029809, 20140108020, 20140119593 and 20150016664, and application Ser. No. 14/725,399, filed May 29, 2015 (now published as 20160275639), Ser. No. 14/724,729, filed May 28, 2015 (now published as 20160217547), and Ser. No. 15/072,884, filed Mar. 17, 2016 (now published as 20170024840). Such watermarks are most commonly imperceptible, meaning they are not noticeable to a viewer examining watermarked artwork from a typical viewing distance (e.g., 20 inches) in typical retail lighting (e.g., 50-85 foot-candles), who has not been alerted previously to the existence of such encoding. Spot colors, as are sometimes found in certain artwork, can be watermarked by leaving tiny voids in the printing to subtly change the luminance or chrominance. Other techniques for watermarking of spot colors are detailed in U.S. Pat. No. 6,763,124 and WO 2016/025631, and application Ser. No. 13/975,919, filed Aug. 26, 2013 (now U.S. Pat. No. 9,449,357), and Ser. No. 14/932,645, filed Nov. 4, 2015 (published as 20160198064).

Some of applicant's other work relating to the present technology is detailed in patent documents 20110161076, 20110212717, 20130150117, 20140106710 and pending application Ser. No. 15/176,498, filed Jun. 8, 2016 (now U.S. Pat. No. 9,922,220), and 62/429,539, filed Dec. 2, 2016.

Applicant's patent filings on barcode recognition include application Ser. No. 15/059,690, filed Mar. 3, 2016 (now U.S. Pat. No. 9,892,301), and Ser. No. 15/094,925, filed Apr. 8, 2016 (now U.S. Pat. No. 10,198,648).

Applicant's patent filings on neural network image recognition include applications 62/371,601, 62/404,721, 62/414,368, 62/418,047, and Ser. No. 15/726,290, filed Oct. 5, 2017. The following third party patent publication is related to the present subject matter, detailing arrangements in which the present technology can be advantageously employed, and vice versa: 20140363044.

Fingerprint-based content identification techniques are also well known. SIFT, SURF, ORB and CONGAS are some of the most popular algorithms. (SIFT, SURF and ORB are each implemented in the popular OpenCV software library, e.g., version 3.) Still other fingerprinting techniques are detailed in patent publications 20090282025, 20060104598, WO2012004626 and WO2012156774 (all by LTU Technologies of France).

Yet other fingerprinting techniques are variously known as Bag of Features, or Bag of Words, methods. Such methods extract local features from patches of an image (e.g., SIFT points), and automatically cluster the features into N groups (e.g., 168 groups)—each corresponding to a prototypical local feature. A vector of occurrence counts of each of the groups (i.e., a histogram) is then determined, and serves as a reference signature for the image. To determine if a query image matches the reference image, local features are again extracted from patches of the image, and assigned to one of the earlier-defined N-groups (e.g., based on a distance measure from the corresponding prototypical local features). A vector occurrence count is again made, and checked for correlation with the reference signature. Further information is detailed, e.g., in Nowak, et al, Sampling strategies for bag-of-features image classification, Computer Vision-ECCV 2006, Springer Berlin Heidelberg, pp. 490-503; and Fei-Fei et al, A Bayesian Hierarchical Model for Learning Natural Scene Categories, IEEE Conference on Computer Vision and Pattern Recognition, 2005; and references cited in such papers.

Optical character recognition (OCR) can be similarly employed to identify objects, and can also be used in embodiments of the present technology This specification has discussed several different embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

The invention claimed is:

1. A method of operating multiple differently-configured signal detectors in a battery-preserving manner, comprising the acts:

receiving a set of audio and/or image content data in a battery-powered device;

for each of N differently-configured signal detectors, where N>2, generating a probability datum indicating an estimate of whether that signal detector will achieve a positive detection result if applied to the received set of content data; and based at least in part on said probability data, selecting M of said N differently-configured signal detectors, where 1<M<N, and invoking the selected signal detectors on the received set of content data;

wherein the method includes limiting processing resources employed by the invoked M detectors so that, in the aggregate, a previously-established processing budget is not exceeded.

2. The method of claim 1 that includes:

for a first set of content data, invoking M1 differently-configured signal detectors;

for a second set of content data, invoking M2 differently-configured signal detectors, where M2>M1; and for a first signal detector that is invoked for both the first and second sets of content data, limiting said first signal detector to a first allocation of processing resources when applied to the first set of content data, and limiting said first signal detector to a second, smaller, allocation of processing resources when applied to the second set of content data.

3. The method of claim 1 in which the received set of content data comprises a frame of image data, and said N differently-configured signal detectors include at least two detectors drawn from the list consisting of: a digital watermark decoder, a 1D barcode decoder, a 2D barcode detector, a face recognizer, an optical character recognizer, a logo recognizer, and an image recognition engine.

4. The method of claim 1 in which the received set of content data comprises a frame of image data, and said N differently-configured signal detectors include a watermark detector configured to examine different blocks within said frame, or blocks with different scales or perspective distortions within said frame.

5. The method of claim 4 in which said N differently-configured signal detectors include a watermark detector configured to examine different blocks within said frame.

6. The method of claim 4 in which said N differently-configured signal detectors include a watermark detector configured to examine blocks at different scales within said frame.

7. The method of claim 1 in which the act of estimating the probability that a first of said signal detectors will achieve a positive detection result, is performed by a neural network.

8. The method of claim 1 in which the previously-established processing budget comprises a time interval permitted to be consumed by operation of said invoked detectors.

9. The method of claim 1 in which the selecting of the M differently-configured signal detectors is also based on history data concerning previous processing of one or more previously-received sets of audio or image content data by one or more of said N signal detectors.

10. The method of claim 9 in which the history data includes data indicating one of said N signal detectors that was previously applied to a previously-received set of content data, and whether said detector previously achieved a positive detection result.

11. The method of claim 9 in which the history data includes data indicating an elapsed interval, either of time or intervening sets of received content data, since a previous processing of one of said previously-received sets of content data by one or said N signal detectors.

12. A method of applying N different detectors, D1 . . . DN, to different frames of image content data, where N is at least three, comprising the acts:

in a round "A" of signal processing:

(a) processing between 1 and N of said different frames of image content data by applying, collectively, all N of the detectors thereto, wherein no detector is applied to more than one buffered frame;

(b) identifying at least two of said detectors, including D1 and D2, that succeed in extracting information in act (a); and (c) identifying at least one of said detectors, DN, that fail in extracting information in act (a);

in a subsequent round "B" of signal processing:

(d) applying said at least two detectors, including D1 and D2, that succeeded in extracting information in round "A" to a single further buffer of content data; and (e) applying detector, DN, which failed in extracting information in round "A," to a different further buffer of content data;

wherein the foregoing acts are performed by a hardware processor.

13. The method of claim 12 in which act (c) comprises identifying plural detectors that fail in extracting information in act (a), and applying each of said plural detectors to a respectively different further frame of of content data in act (e); wherein each of the N detectors is applied in said subsequent round "B".

14. The method of claim 13 in which, in round "B," at least a pair of said detectors succeeded in extracting information from the frame of content data to which they were respectively applied, and in which the method further includes:
   in a round "C" of signal processing that follows round "B:"
   (f) applying those detectors that succeeded in extracting information in round "B" to yet a different single frame of content data; and
   (g) applying those detectors that failed in extracting information in round "B" each, respectively, to still a different frame of content data;
   wherein application of plural detectors to a single frame occurs only following a plurality of detectors succeeding in extracting information in an immediately-preceding round of signal processing.

15. The method of claim 12 in which a number of frames of image data processed in round "B" is equal to the lesser of N, and N+1 minus a number of detectors that succeeded in extracting information in act (a).

16. A method of applying N different detectors, D1 . . . DN, to buffered frames of image content data, comprising the acts:
   in a phase "A" of signal processing, processing a single buffered frame of image content with between 2 and N−1 of said N detectors;
   in a phase "B" of signal processing that immediately follows phase "A," processing a different single buffered frame of image content with plural of said detectors, including all of the detectors that succeeded in extracting information in phase "A," together with one detector that was not applied—or did not succeed in extracting information, in phase "A,"
   wherein the foregoing acts are performed by a hardware processor.

17. The method of claim 16 that further includes, in a phase "C" of signal processing applying only a single detector, except when a detector applied to in an immediately-preceding phase of signal processing succeeded in extracting information.

18. The method of claim 16 wherein, for each group of N successive buffered frames of image content data, each of the N different detectors is applied.

* * * * *